Patented June 30, 1936

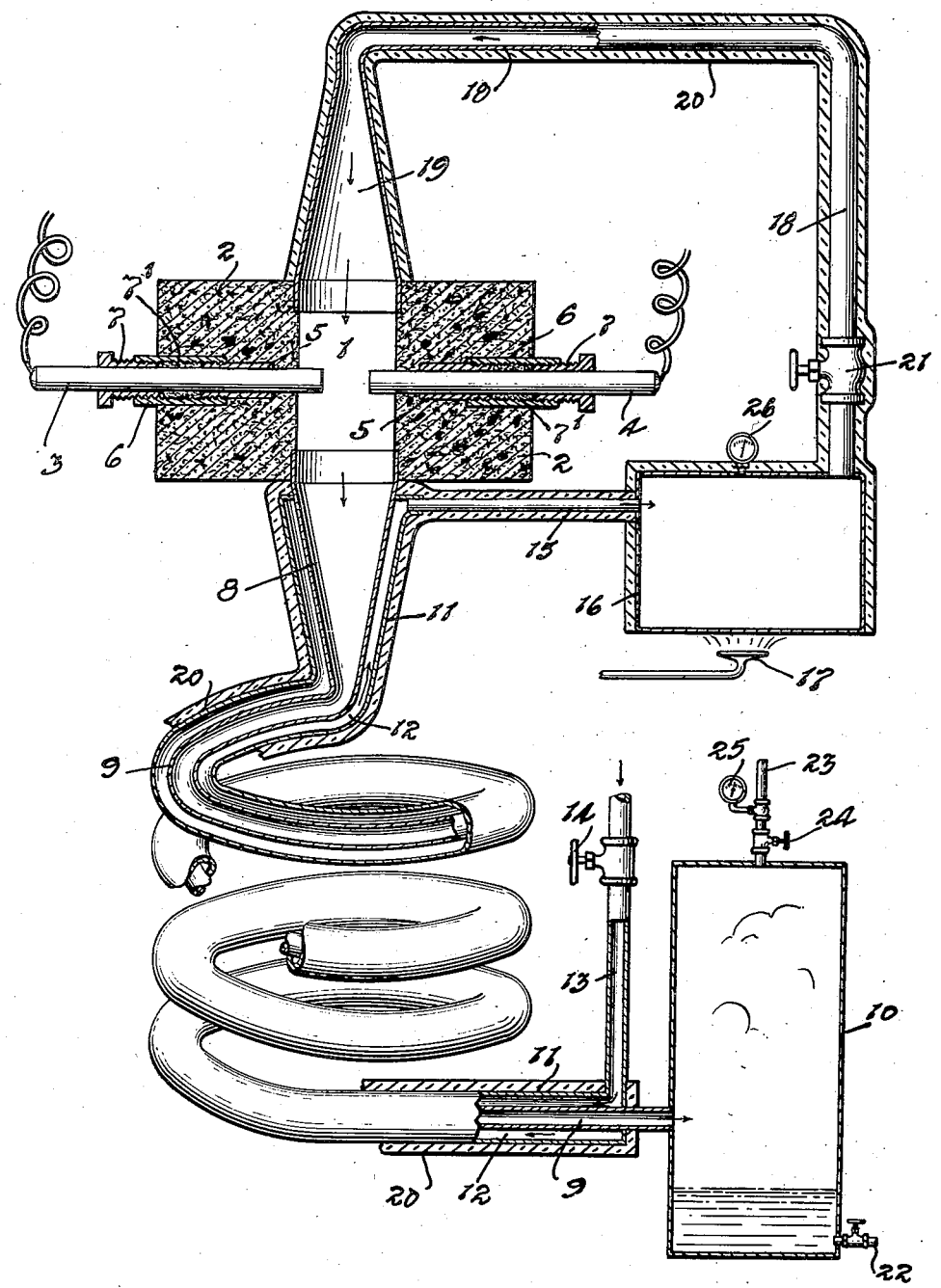

2,045,832

UNITED STATES PATENT OFFICE 2,045,832

APPARATUS FOR PRODUCING HYDROGEN

Herbert D. Carter, Winnipeg, Manitoba, Canada

Application August 28, 1931, Serial No. 559,815

2 Claims. (Cl. 204—31)

The invention relates to improvements in apparatus for producing hydrogen and an object of the invention is to provide an apparatus by the use of which hydrogen can be obtained in sufficient quantity and at such a cost of production as to render its use for commercial purposes possible and further to provide a simple relatively inexpensive, easily operated apparatus for the above purpose which takes a relatively small space when installed and which gives a large hydrogen yield at low cost.

With the above objects in view, the invention consists essentially in the arrangement and construction of parts herein disclosed, reference being had to the accompanying drawing, in which:

The figure presents schematically the apparatus employed, certain parts being shown in side elevation and others vertical section.

In carrying out my invention, I provide a reaction chamber 1 which is contained within a refractory or heat resisting body 2 which is electrically insulating and may be formed from Portland cement mixed with asbestos powder. Through the walls of the body 2 I pass aligned electrodes 3 and 4 such as copper sheathed carbon rods, the electrodes being mounted so that they can be adjusted endwise when desired.

I have herein shown each electrode as slidably mounted in a short length of receiving pipe 5 which carries a sleeve 6 into the outer end of which is screw threaded a packing gland 7, there being a packing material 7' inserted around the electrode between the outer end of the pipe 5 and the gland, this insuring that when the gland is tightened up, there will be no leakage from the re-action chamber. The outer ends of the electrodes are connected in any suitable manner to a suitable source of electromotive force.

In operation, the electrodes are brought together and then pulled apart to strike an arc and this having been done, it will be necessary to adjust the carbons from time to time to compensate for the wearing away of the carbons and if desired provision can be made so that this will be done automatically as is common practice in electrical apparatus now in use.

A conically shaped outlet pipe 8 leads downwardly from the lower end of the re-action chamber and communicates with an exhaust pipe 9, this latter pipe leading to a collecting container 10. An outer pipe 11 contains the outlet 8 and the pipe 9 and is spaced from such parts to provide a surrounding passage 12, this passage having the lower end communicating with a water pipe 13 leading to a source of water supply such as a domestic water tap. A valve 14 is introduced in the pipe 13 for controlling the flow of the water. The upper end of the passage 12 is connected by a pipe 15 to a super-heater which is herein shown as a jacket 16 heated by an underlying gas burner 17. Any suitable means can be used, however, for heating the jacket. A pipe 18 leads from the jacket and communicates with a conically shaped inlet pipe 19 opening to the re-action chamber in a location directly above and aligned with the outlet pipe 8.

The majority of the parts hereinbefore described are enclosed in some heat insulating medium 20 such as asbestos packing but a more efficient method would be to enclose the apparatus in a box or sheath touching the apparatus at as few points as possible and evacuating the space therebetween, the vacuum thus formed being as is well known an excellent heat insulator.

The pipe 18 is supplied with a control valve 21 and the container 10 has a valve controlled draw off pipe 22 and a gas outlet pipe 23 provided with a valve 24 and a flow gauge 25. The jacket 16 is supplied with a pressure gauge 26.

In operation, there is a down flow from the reaction chamber through the pipes 8 and 9 of heated products and there is an up flow through the passage 12 from the pipe 13 to passage 15 and the heated exhaust products are utilized to heat the incoming flow through the passage 12, it being desirable to have all the heat of the exhaust products given to the incoming flow. I have shown the pipes 9 and 11 in the form of coils so as to give a sufficient length of pipe in a relatively small area in order to allow of effective heat exchange between the exhaust products and the inflowing material.

When it is desired to start the apparatus, one generates steam in the super-heater and sees that the valve 21 is open and steam is passed through the apparatus until the whole is thoroughly heated. The carbon electrodes are then brought together and separated to strike an arc and the heated products from the re-action chamber flow down through the pipe 9 to the collecting container and are utilized to heat the water passed into the apparatus through the pipe 13. By the transfer of heat, steam is formed in the passage 12 by absorption of heat from the exhaust products from the re-action chamber and this steam enters the super-heater at a temperature only slightly less than that of the exhaust products, the difference in temperature depending upon the amount of heat lost by the whole system by radiation and conduction to the surroundings. The super-heater is utilized to bring the temperature of the admitted steam up to the desired intake temperature for introduction into the re-action chamber.

In the re-action chamber the flowing steam is acted upon by the arc and as before stated, the products pass downwardly and are discharged into the container 10, such out going products giving up their heat to the material passing in through the passage 12.

I have found that the exhaust from the reaction chamber consists of some unchanged steam and gaseous products and that the gas obtained is 90% or better hydrogen. Carbon dioxide and carbon monoxide and slight traces of hydro-carbon gases and oxygen are given off but the major gaseous product collecting in the container 10 is hydrogen. The gas can be exhausted from the container by opening the valve 24 and any surplus distilled water can be drained from the bottom of the container 10 through the pipe 22. If desired a catalytic agent may be employed situated in or near the arc region.

In an actual apparatus which I have used the electrical power consumed was in the neighborhood of 350 watts, the current being 10 amperes A. C. and the potential difference 35 volts. The pressure in the water main feeding to the passage 12 was in the neighborhood of 50 pounds per square inch and the super-heater supplied steam to the re-action chamber at a temperature approximately 500° C. and the flow of steam through the re-action chamber was with a lineal velocity of over 1000 metres per minute. The yield of hydrogen in the container was 2000 cubic centimetres per minute measured at atmospheric pressure and 20° C.

The quantity of hydrogen desired per unit time governs the adjustment of the controlling factors. For economical operation, the flow rate should first be increased until a maximum flow of hydrogen (or gaseous products) is obtained for a given electrical power consumption, then the electrical power may be increased and the steam flow increased and so on, this being done by manipulating the valve 21. Addition of pressure will increase the flow within certain limits. The length of the arc is best adjusted by an automatic device which will feed the carbon electrodes in as the arc length increases and with an automatic electrode feed, no attention is required after the arc is started provided the super-heater is provided with a thermostatic control.

The hydrogen may be supplied under pressure if desired by simply shutting the valve 24. Altering either the temperature or pressure will alter the rate of flow, power consumed and so forth and the pressure and temperature for economical operation must be determined by trial.

What I claim as my invention is:—

1. An apparatus for producing hydrogen consisting of a superheated jacket and a re-action chamber having carbon arcs extending therewithin, an inlet conduit leading from a source of supply to said superheated jacket, a conduit extending between said superheated jacket and into said re-action chamber, and an exhaust conduit extending from said re-action chamber, said exhaust conduit being encased within said inlet conduit.

2. An apparatus for producing hydrogen consisting of a superheated jacket and a re-action chamber having carbon arcs extending therewithin, an inlet conduit extending from a source of supply to said superheated jacket, a conduit extending from said superheated jacket and into the re-action chamber at the upper end thereof, an exhaust conduit leading from said re-action chamber at the lower end thereof, said exhaust conduit being housed within said inlet conduit.

HERBERT D. CARTER.